United States Patent [19]

Tatsumi

[11] Patent Number: 5,184,214
[45] Date of Patent: Feb. 2, 1993

[54] IMAGE OUTPUT SYSTEM

[75] Inventor: Setsuji Tatsumi, Kanagawa, Japan

[73] Assignee: Fuji Photo Film Co., Ltd., Kanagawa, Japan

[21] Appl. No.: 563,649

[22] Filed: Aug. 7, 1990

[30] Foreign Application Priority Data

Aug. 8, 1989 [JP] Japan .................. 1-206237

[51] Int. Cl.$^5$ .................. H04N 1/46; H04N 9/04; G03F 3/08
[52] U.S. Cl. .................. 358/75; 358/80; 358/41
[58] Field of Search .................. 358/75, 80, 21 R, 41, 358/160, 168, 169, 400, 401, 443

[56] References Cited

U.S. PATENT DOCUMENTS 4,622,582 11/1986 Yamada .................. 358/80
4,841,360 6/1989 Birgmeir .................. 358/80

FOREIGN PATENT DOCUMENTS 63-116855 5/1988 Japan.

Primary Examiner—Edward L. Coles, Sr.
Assistant Examiner—Thomas D. Lee
Attorney, Agent, or Firm—Sughrue, Mion, Zinn, Macpeak & Seas

[57] ABSTRACT

An image output system processes an input image signal from an image signal source, such as a television camera, to produce an output image signal to record an image on an image recording medium. The input image signal is logarithmically converted into an image signal which matches the image output system, using a first look-up table which is selected to match the image signal source. Then, the image signal, which has been converted by the first look-up table, is linearly converted into an image signal based on first corrective parameters set to achieve given color qualities. The image signal, which has been linearly converted, is converted an image signal which matches the image recording medium, using a second look-up table which is selected to match the image recording medium. The image signal, which has been converted by the second look-up table, is exponentially converted into an exponential output image signal based on second corrective parameters set to achieve given color qualities.

5 Claims, 9 Drawing Sheets

| COLOR | STEP | $\delta ac_1$ | $\delta am_1$ | $\delta ay_1$ | $\delta bc_1$ | $\delta bm_1$ | $\delta by_1$ |
|---|---|---|---|---|---|---|---|
| CYAN | -4 | 0.936 | 1.032 | 1.032 | -24 | 12 | 12 |
| | -3 | 0.952 | 1.024 | 1.024 | -18 | 9 | 9 |
| | -2 | 0.968 | 1.016 | 1.016 | -12 | 6 | 6 |
| | -1 | 0.984 | 1.008 | 1.008 | -6 | 3 | 3 |
| | 0 | 1.0 | 1.0 | 1.0 | 0 | 0 | 0 |
| | 1 | 1.016 | 0.992 | 0.992 | 6 | -3 | -3 |
| | 2 | 1.032 | 0.984 | 0.984 | 12 | -6 | -6 |
| | 3 | 1.048 | 0.976 | 0.976 | 18 | -9 | -9 |
| | 4 | 1.064 | 0.968 | 0.968 | 24 | -12 | -12 |

| COLOR | STEP | $\delta ac_2$ | $\delta am_2$ | $\delta ay_2$ | $\delta bc_2$ | $\delta bm_2$ | $\delta by_2$ |
|---|---|---|---|---|---|---|---|
| MAGENTA | -4 | 1.032 | 0.936 | 1.032 | 12 | -24 | 12 |
| | -3 | 1.024 | 0.952 | 1.024 | 9 | -18 | 9 |
| | -2 | 1.016 | 0.968 | 1.016 | 6 | -12 | 6 |
| | -1 | 1.008 | 0.984 | 1.008 | 3 | -6 | 3 |
| | 0 | 1.0 | 1.0 | 1.0 | 0 | 0 | 0 |
| | 1 | 0.992 | 1.016 | 0.992 | -3 | 6 | -3 |
| | 2 | 0.984 | 1.032 | 0.984 | -6 | 12 | -6 |
| | 3 | 0.976 | 1.048 | 0.976 | -9 | 18 | -9 |
| | 4 | 0.968 | 1.064 | 0.968 | -12 | 24 | -12 |

FIG.4c

| COLOR | STEP | $\delta ac_3$ | $\delta am_3$ | $\delta ay_3$ | $\delta bc_3$ | $\delta bm_3$ | $\delta by_3$ |
|---|---|---|---|---|---|---|---|
| YELLOW | -4 | 1.032 | 1.032 | 0.936 | 12 | 12 | -24 |
| | -3 | 1.024 | 1.024 | 0.952 | 9 | 9 | -18 |
| | -2 | 1.016 | 1.016 | 0.968 | 6 | 6 | -12 |
| | -1 | 1.008 | 1.008 | 0.984 | 3 | 3 | -6 |
| | 0 | 1.0 | 1.0 | 1.0 | 0 | 0 | 0 |
| | 1 | 0.992 | 0.992 | 1.016 | -3 | -3 | 6 |
| | 2 | 0.984 | 0.984 | 1.032 | -6 | -6 | 12 |
| | 3 | 0.976 | 0.976 | 1.048 | -9 | -9 | 18 |
| | 4 | 0.968 | 0.968 | 1.064 | -12 | -12 | 24 |

FIG.4d

| | STEP | $\delta ac_4$ | $\delta am_4$ | $\delta ay_4$ | $\delta bc_4$ | $\delta bm_4$ | $\delta by_4$ |
|---|---|---|---|---|---|---|---|
| BRIGHTNESS | -4 | 0.872 | 0.872 | 0.872 | -144 | -144 | -144 |
| | -3 | 0.904 | 0.904 | 0.904 | -108 | -108 | -108 |
| | -2 | 0.936 | 0.936 | 0.936 | -72 | -72 | -72 |
| | -1 | 0.968 | 0.968 | 0.968 | -36 | -36 | -36 |
| | 0 | 1.0 | 1.0 | 1.0 | 0 | 0 | 0 |
| | 1 | 1.032 | 1.032 | 1.032 | 36 | 36 | 36 |
| | 2 | 1.064 | 1.064 | 1.064 | 72 | 72 | 72 |
| | 3 | 1.096 | 1.096 | 1.096 | 108 | 108 | 108 |
| | 4 | 1.128 | 1.128 | 1.128 | 144 | 144 | 144 |

| CONTRAST | STEP | $\delta ac_s$ | $\delta am_s$ | $\delta ay_s$ | $\delta bc_s$ | $\delta bm_s$ | $\delta by_s$ |
|---|---|---|---|---|---|---|---|
| | -2 | 0.50 | 0.50 | 0.50 | 180 | 180 | 180 |
| | -1 | 0.75 | 0.75 | 0.75 | 90 | 90 | 90 |
| | 0 | 1.00 | 1.00 | 1.00 | 0 | 0 | 0 |
| | 1 | 1.25 | 1.25 | 1.25 | -90 | -90 | -90 |
| | 2 | 1.50 | 1.50 | 1.50 | -180 | -180 | -180 |

| | $\delta ac_s$ | $\delta am_s$ | $\delta ay_s$ | $\delta bc_s$ | $\delta bm_s$ | $\delta by_s$ |
|---|---|---|---|---|---|---|
| CORRECTIVE VALUE FOR OHP | 1.2 | 1.2 | 1.2 | 0 | 0 | 0 |

| | $ac_0$ | $am_0$ | $ay_0$ | $bc_0$ | $bm_0$ | $by_0$ |
|---|---|---|---|---|---|---|
| DEFAULT VALUE | 1 | 1 | 1 | 0 | 0 | 0 |

IMAGE OUTPUT SYSTEM

BACKGROUND OF THE INVENTION

The present invention relates to an image output system for processing an input image signal from an image signal source to produce an output image signal for recording an image on an image recording medium.

There are known image output systems which process input image signals from various image signal sources such as television cameras, video discs, computer graphic systems, etc. so as to record visible images on image recording mediums. When an optimum image is to be recorded on an image recording medium, it is necessary to process the input image signal from the image signal source into an image signal adapted to the image output system and also to the characteristics of the image recording medium.

One conventional image output system which processes input image signals to meet such requirements is disclosed in Japanese Laid-Open Patent Publication No. 63-116855. The disclosed image output system has two look-up tables for image signal conversion. More specifically, the first look-up table converts an input image signal from an image signal source into an image signal adapted to the image output system, and the second look-up table converts the image signal into an image signal adapted to an image signal medium.

If the image recording medium is in the form of a photographic film which is coated with a photosensitive material, the amount of exposure to which the image recording medium is subjected is not linearly proportional to the brightness of an image which is produced on the image recording medium as a result of the exposure, and it is highly difficult to correct such a characteristic of the image recording medium using the second look-up table which effects only linear arithmetic operations with respect to the amount of exposure. The above characteristic of the image recording medium varies depending on cyan, magenta, and yellow which are colors to produce colored images. Therefore, if the characteristics of the image recording medium with respect to these colors are not accurately corrected, the gray balance of a reproduced colored image is poor. It is also difficult to correct image signals for a colored image on an image recording medium in view of human visual characteristics because the human visual characteristics are substantially linear to the logarithm of the amount of exposure to which the image recording medium is subjected.

SUMMARY OF THE INVENTION

It is a principal object of the present invention to provide an image output system which allows highly easy adjustments of images depending on the image signal source and the image recording medium which are used, so that optimum image signals can be obtained with ease.

Another object of the present invention is to provide an image output system for processing an input image signal from an image signal source to produce an output image signal to record an image on an image recording medium, comprising a first look-up table for converting an input image signal into an image signal which matches the image output system, the first look-up table being selected to match the image signal source, linear converting means for linearly converting the image signal, which has been converted by the first look-up table, into an image signal based on first corrective parameters set to achieve given color tone, a second look-up table for converting the image signal, which has been converted by the linear converting means, into an image signal which matches the image recording medium, the second look-up table being selected to match the image recording medium, and exponential converting means for converting the image signal, which has been converted by the second look-up table, into an exponential output image signal based on second corrective parameters set to achieve given color tone.

Still another object of the present invention is to provide the image output system wherein the first look-up table comprises means for logarithmically converting the input image signal into the image signal.

Yet another object of the present invention is to provide the image output system wherein the linear converting means comprises means for linearly converting image data $LUT\_S(Ri)$, $LUT\_S(Gi)$, $LUT\_S(Bi)$, corresponding to red-color, green-color, and blue-color input image data $Ri$, $Gi$, $Bi$, which image data have been converted by the first look-up table, into image data $Ce$, $Me$, $Ye$ which are expressed by:

$$Ce = ac*LUT\_S(Ri) + bc$$

$$Me = am*LUT\_S(Gi) + bm$$

$$Ye = ay*LUT\_S(Bi) + by$$

where $ac$, $am$, and $ay$ are contrast parameters and $bc$, $bm$, $an$ are brightness parameters, the contrast and brightness parameters being set according to the first corrective parameters and corresponding to the colors of cyan, magenta, and yellow. The symbol "*" is the FORTRAN notation for multiplication.

A further object of the present invention is to provide the image output system wherein the contrast parameters $ac$, $am$, $ay$ and the brightness parameters $bc$, $bm$, $by$ are defined by:

$$ac = ac_0 * \delta ac_1 * \delta ac_2 * \delta ac_3 * \delta ac_4 * \delta ac_5 * \delta ac_6$$

$$am = am_0 * \delta am_1 * \delta am_2 * \delta am_3 * \delta am_4 * \delta am_5 * \delta am_6$$

$$ay = ay_0 * \delta ay_1 * \delta ay_2 * \delta ay_3 * \delta ay_4 * \delta ay_5 * \delta ay_6$$

$$bc = bc_0 + \delta bc_1 + \delta bc_2 + \delta bc_3 + \delta bc_4 + \delta bc_5 + \delta bc_6$$

$$bm = bm_0 + \delta bm_1 + \delta bm_2 + \delta bm_3 + \delta bm_4 + \delta bm_5 + \delta bm_6$$

$$by = by_0 + \delta by_1 + \delta by_2 + \delta by_3 + \delta by_4 + \delta by_5 + \delta by_6$$

where $\delta ac_1$ through $\delta ac_3$, $\delta am_1$ through $\delta am_3$, $\delta ay_1$ through $\delta ay_3$, $\delta bc_1$ through $\delta bc_3$, $\delta bm_1$ through $\delta bm_3$, and $\delta by_1$ through $\delta by_3$ are first corrective parameters set for the colors of cyan, magenta, and yellow so as to correspond to brightness steps thereof, $\delta ac_4$, $\delta am_4$, $\delta ay_4$, $\delta bc_4$, $\delta bm_4$, $\delta by_4$ are first corrective parameters set for the colors of cyan, magenta, and yellow so as to correspond to general brightness steps thereof, $\delta ac_5$, $\delta am_5$, $\delta ay_5$, $\delta bc_5$, $\delta bm_5$, $\delta by_5$ are first corrective parameters set for the colors of cyan, magenta, and yellow so as to correspond to general brightness steps thereof, $\delta ac_6$, $\delta am_6$, $\delta ay_6$, $\delta bc_6$, $\delta bm_6$, $\delta by_6$ are first corrective parameters set so as to match the image recording medium, and $ac_0$, $am_0$, $ay_0$, $bc_0$, $bm_0$, $by_0$ are first corrective parameters as initial parameters.

A still further object of the present invention is to provide the image output system wherein the exponential converting means comprises means for exponentially converting cyan, magenta, yellow image data Ca, Ma, Ya, which have been converted by the second look-up table, into exponential image data Cql, Mql, Yql which are expressed by:

$$Cql = 2^{**}(\alpha c^* Ca + \beta c)$$

$$Mql = 2^{**}(\alpha m^* Ma + \beta m)$$

$$Yql = 2^{**}(\alpha y^* Ya + \beta y)$$

where $\alpha c$, $\alpha m$, $\alpha y$ are contrast parameters serving as second corrective parameters for the respective colors of cyan, magenta, yellow, and $\beta c$, $\beta m$, $\beta y$ are brightness parameters serving as second corrective parameters for the respective colors of cyan, magenta, and yellow. The symbol "**" is the FORTRAN notation for exponentiation.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIGS. 4a through 4g are diagrams of parameter tables of first corrective parameters;

DETAILED DESCRIPTION OF THE PREFERRED EMBODIMENT

Figure 2:
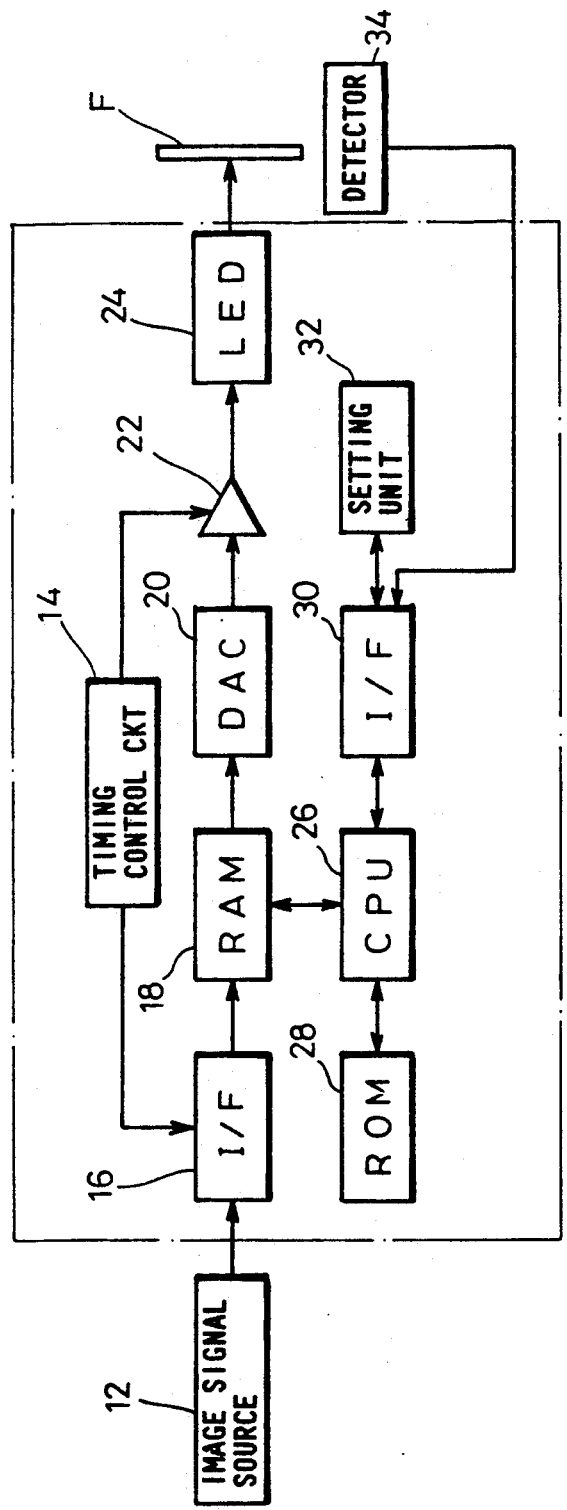
FIG. 2 is a detailed bock diagram of the image output system.

FIG. 2 shows an image output system, generally designated by the reference numeral 10, according to the present invention. The image output system 10 processes an input image signal from an image signal source 12 such as a television camera or the like, and records a colored image on a photosensitive image recording medium F based on the processed input image signal.

The image output system 10 comprises a timing control circuit 14, an interface 16 for receiving an input image signal from the image signal source 12 based on a timing signal produced by the timing control circuit 14, a RAM 18 for storing tables of data to process the input image signal, a D/A converter 20 for converting the processed image signal from the RAM 18 into an analog signal, an amplifier 22 for amplifying the analog signal based on the timing signal from the timing control circuit 14, and three LEDs 24 for emitting lights to develop the colors of cyan, magenta, and yellow on the image recording medium F based on the analog signal amplified by the amplifier 22. The image output system 10 also has a CPU 26 and a ROM 28. The ROM 28 stores first look-up tables (described later) for converting the input image signal from the image signal source 12 into an image signal which is adapted to the image input system 10, second look-up tables (described later) for converting the image signal into an image signal which is adapted to the image recording medium F, and first and second corrective parameters (described later) for obtaining desired color qualities or tones. To the CPU 26, there are connected a setting unit 32 such as a keyboard or the like and a detector 34 through an interface 30.

The operator of the image output system sets using the setting unit 32, a first look-up table which is adapted to the image signal source 12, a second look-up table which is adapted to the image recording medium F, and first and second parameters for adjusting the color qualities of the image signal. The detector 34 serves to determine the type of the image recording medium F. In the illustrated embodiment, the detector 34 determines whether the image recording medium F is made of an ordinary photosensitive material or a film for use with OHP, based on the light transmittance of the image recording medium F.

The image output system according to the present invention is basically constructed as described above. Operation and advantages of the image output system will now be described below.

Figure 1:
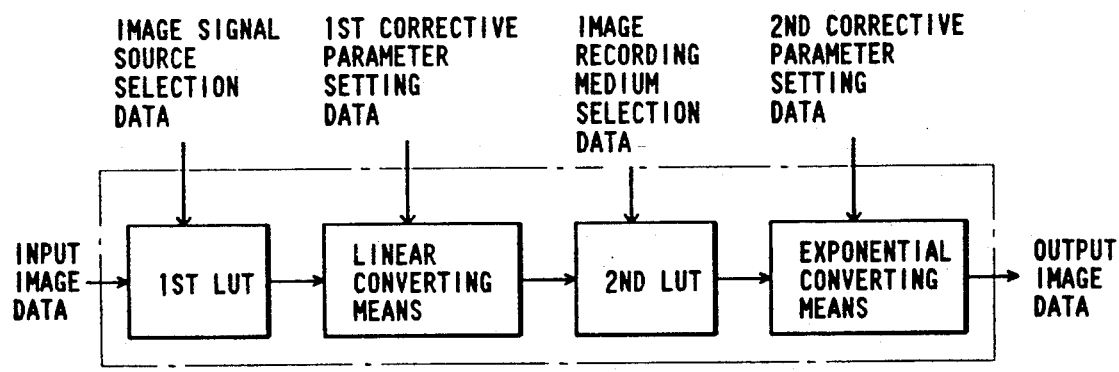
FIG. 1 is a block diagram schematically showing a signal processing sequence effected by an image output system according to the present invention.

FIG. 1 schematically shows a signal processing sequence which is executed by the image output system 10. Operation of the image output system will be described with reference to FIGS. 1 and 2.

Figure 3:
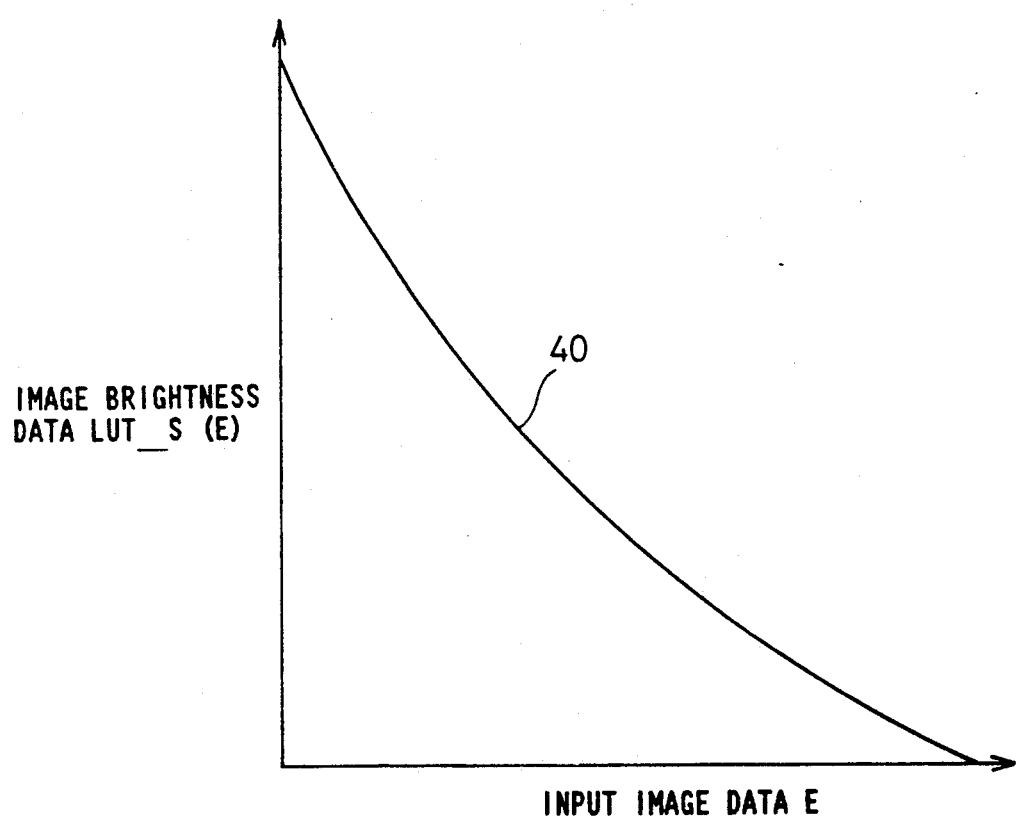
FIG. 3 is a graph showing a first look-up table used in the image output system.

Image signal source selection data for selecting a first look-up table that is adapted to the image signal source 12 connected to the image output system 10 are entered through the setting unit 32 by the operator. The image signal source selection data which are entered are transferred through the interface 30 to the CPU 26, which then selects a first look-up table 40 (see FIG. 3) adapted to the image signal source 12 from the ROM 28.

There are a plurality of first look-up tables 40 stored in the ROM 28 which correspond to different types of the image signal source 12 that can be used with the image output system 10. If the input image signal is a video signal from a television camera, for example, then the selected look-up table 40 converts input image data E based on the input image signal into image contrast data LUT_S(E) which are expressed by:

$$LUT\_S(E) = -k \cdot log_2 E \qquad \ldots (1)$$

where k is a coefficient inherent in the image signal source 12. The input image data E correspond to, for example, red-color data Ri, green-color data Gi, and blue-color data Bi from the image signal source 12.

To adjust the color qualities or tones of an image to be reproduced on the image recording medium F, the operator enters first corrective parameter setting data through the setting unit 32. The first corrective parameter setting data which are entered are transmitted through the interface 30 to the CPU 26. The detector 34, which is located near the image recording medium F, detects whether the image recording medium F is an OHP film or not, and transfers a signal representative of whether it is an OHP film or not to the CPU 26 through the interface 30.

Based on the first corrective parameter setting data from the setting unit 32 and the detected signal from the detector 34, the CPU 26 selects first corrective parameters from parameter tables 42a through 42g (FIG. 4a through 4g) stored in the ROM 28. Then, using the selected first corrective parameters, the CPU 26 calculates linearly converted image contrast data Ce, Me, Ye corresponding to the colors of cyan, magenta, and yellow, according to the following equations:

$$Ce = ac * LUT\_S(Ri) + bc \quad \ldots (2a)$$

$$Me = am * LUT\_S(Gi) + bm \quad \ldots (2b)$$

$$Ye = ay * LUT_{13}S(Bi) + by \quad \ldots (2c)$$

where ac, am, and ay are contrast parameters which are defined respectively by:

$$ac = ac_0 * \delta ac_1 * \delta ac_2 * \delta ac_3 * \delta ac_4 * \delta ac_5 * \delta ac_6 \quad \ldots (3a)$$

$$am = am_0 * \delta am_1 * \delta am_2 * \delta am_3 * \delta am_4 * \delta am_5 * \delta am_6 \quad \ldots (3b)$$

$$ay = ay_0 * \delta ay_1 * \delta ay_2 * \delta ay_3 * \delta ay_4 * \delta ay_5 * \delta ay_6 \quad \ldots (3c)$$

and bc, bm, an by are brightness parameters which are defined respectively by:

$$bc = bc_0 + \delta bc_1 + \delta bc_2 + \delta bc_3 + \delta bc_4 + \delta bc_5 + \delta bc_6 \quad \ldots (4a)$$

$$bm = bm_0 + \delta bm_1 + \delta bm_2 + \delta bm_3 + \delta bm_4 + \delta bm_5 + \delta bm_6 \quad \ldots (4b)$$

$$by = by_0 + \delta by_1 + \delta by_2 + \delta by_3 + \delta by_4 + \delta by_5 + \delta by_6 \quad \ldots (4c)$$

For example, when the operator specifies brightness steps for the colors of cyan, magenta, and yellow through the setting unit 32, the CPU 26 selects the first corrective parameters $\delta ac_1$ through $\delta ac_3$, $\delta am_1$ through $\delta am_3$, $\delta ay_1$ through $\delta ay_3$, $\delta bc_1$ through $\delta bc_3$, $\delta bm_1$ through $\delta bm_3$, and $\delta by_1$ through $\delta by_3$ corresponding to the specified brightness steps (see FIGS. 4a through 4c). When the operator specifies general brightness steps for cyan, magenta, and yellow, the CPU 26 selects the corresponding first corrective parameters $\delta ac_4$, $\delta am_4$, $\delta ay_4$, $\delta bc_4$, $\delta bm_4$, $\delta by_4$ (see FIG. 4d). When the operator specifies general contrast steps for cyan, magenta, and yellow, the CPU 26 selects the corresponding first corrective parameters $\delta ac_5$, $\delta am_5$, $\delta ay_5$, $\delta bc_5$, $\delta bm_5$, $\delta by_5$ (see FIG. 4e). From the first corrective parameters and the first corrective parameters $ac_0$, $am_0$, $ay_0$, $bc_0$, $bm_0$, $by_0$ which are default values shown in FIG. 4g, the CPU 26 determines contrast parameters ac, am, ay as gains and brightness parameters bc, bm, by as offsets, and calculates the linearly converted image brightness data Ce, Me, Ye for the desired color qualities or tones, using the above parameters, according to the equations (2a) through 2(c) referred to above. If the image recording medium F is an OHP film, then the contrast parameters ac, am, ay are corrected by the parameters $\delta ac_6$, $\delta am_6$, $\delta ay_6$, $\delta bc_6$, $\delta bm_6$, $\delta by_6$ shown in FIG. 4f in order to record an image whose brightness is higher than that on an ordinary image recording medium.

Figure 5:
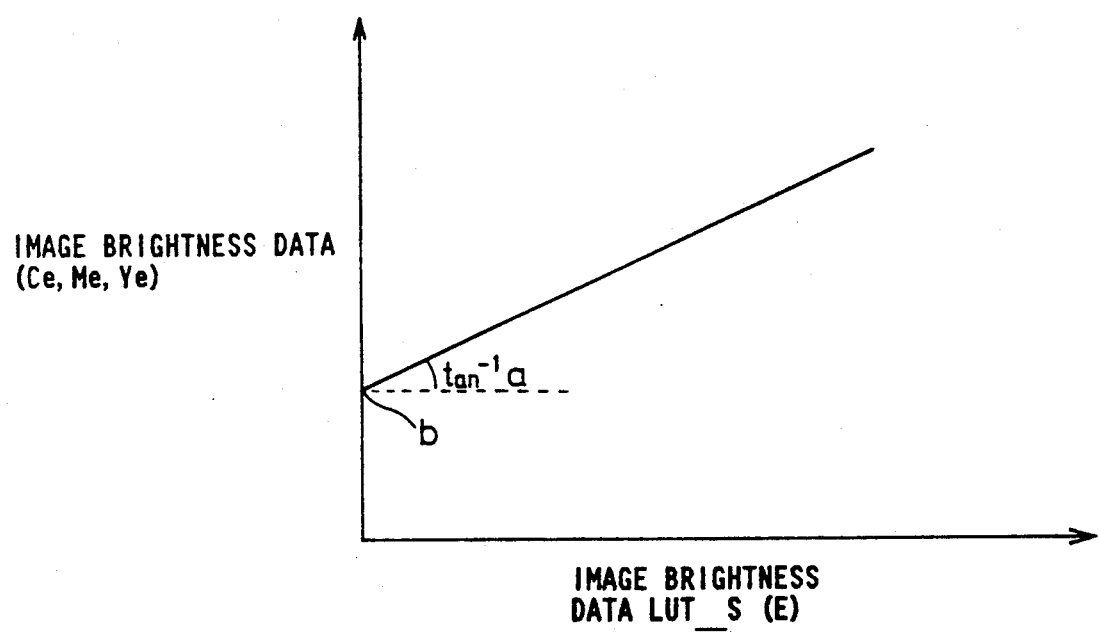
FIG. 5 is a graph illustrative of a linear conversion process carried out by a linear converting means.

The equations (2a) through (2c) convert the image brightness data LUT_S(E), which have been nonlinearly converted by the first look-up table 40, into linear data for desired color qualities or tones, as shown in FIG. 5. Since the image brightness data LUT_S(E) are made linear by the logarithmic conversion using the first look-up table 40, the first corrective parameter setting data and the color qualities are linearly related to each other, and hence the color qualities can easily and accurately be adjusted to meet human sensory requirements. Moreover, inasmuch as the input image data are logarithmically converted into the image brightness data LUT_S(E) according to the equation (1), color quality adjustments matching human visual characteristics can be carried out. In FIG. 5, the gain for each color is indicated by a, and the offset for each color is indicated by b.

The parameter tables 42a through 42g are arranged such that the color qualities can be adjusted when both the contrast parameters ac, am, ay and the brightness parameters bc, bm, by are changed. However, the parameter tables 42a through 42g may be arranged such that the contrast of colors may be adjusted when both the contrast and brightness parameters are changed and the brightness of colors may be adjusted when only the brightness parameters are changed.

The parameter tables 42a through 42g will be described below in more specific detail. When the brightness is to be increased, the parameters $\delta ac_4$, $\delta am_4$, $\delta ay_4$ are selected to be greater than 1, and when the brightness is to be reduced, the parameters $\delta ac_4$, $\delta am_4$, $\delta ay_4$ are selected to be smaller than 1. When the brightness of cyan, for example, is to be increased, the parameter $\delta ac_1$ is selected to be greater than 1, the parameter $\delta am_1$ smaller than 1, the parameter $\delta ay_1$ smaller than 1, the parameter $\delta bc_1$ greater than 0, the parameter $\delta bm_1$, smaller than 0, and the parameter $\delta by_1$ smaller than 0. When the brightness of cyan is to be reduced, the parameter $\delta ac_1$ is selected to be smaller than 1, the parameter $\delta am_1$ greater than 1, the parameter $\delta ay_1$ greater than 1, the parameter $\delta bc_1$ smaller than 0, the parameter $\delta bm_1$ greater than 0, and the parameter $\delta by_1$ greater than 0.

Figure 6:
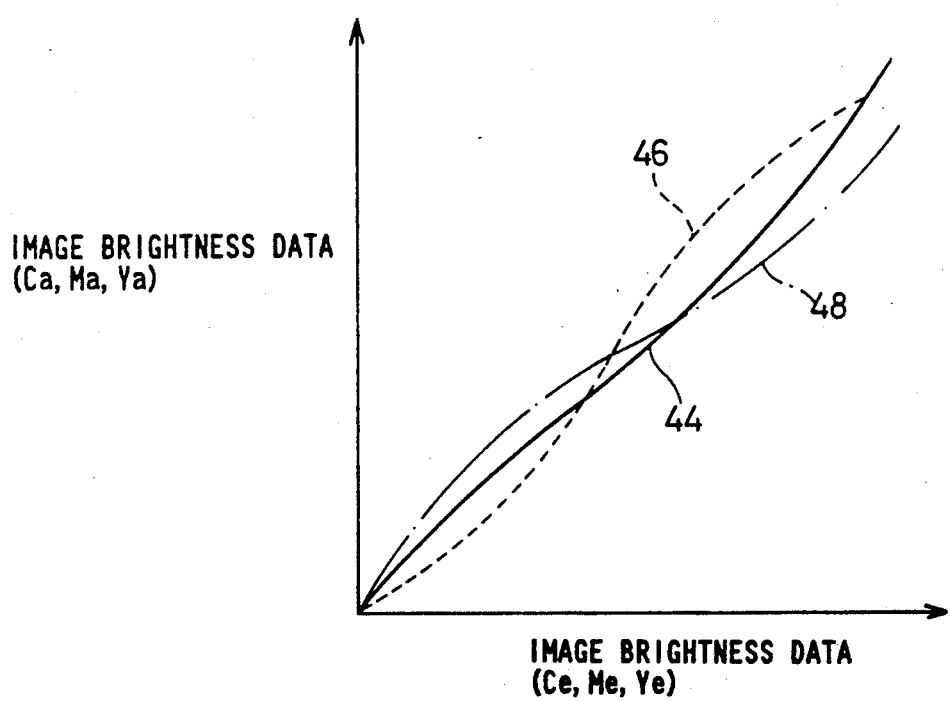
FIG. 6 is a graph showing a second look-up table used in the image output system.

Then, to meet the characteristics of the image recording medium F, the operator enters image recording medium selection data through the setting unit 32. The entered image recording medium selection data are transferred through the interface 30 to the CPU 26, which then selects second look-up tables 44, 46, 48 adapted to the image recording medium F for the respective colors of cyan, magenta, and yellow (see FIG. 6). Using the second look-up tables 44, 46, 48, the CPU 26 converts the image brightness data Ce, Me, Ye into image brightness data Ca, Ma, Ya which are expressed by:

$$ca = LUT\_enl\_c(Ce) \quad \ldots (5a)$$

$$Ma = LUT\_enl\_m(Me) \quad \ldots (5b)$$

$$Ya = LUT\_enl\_y(Ye) \quad \ldots (5c)$$

where LUT_enl_c, LUT_enl_m, LUT_enl_y are symbols meaning the conversion of the image brightness data Ce, Me, Ye into the image brightness data Ca, Ma, Ya using the second look-up tables 44, 46, 48, respectively. At this time, the image brightness data Ce, Me, Ye are converted into data which are appropriately adapted to the nonlinear characteristics of the image recording medium F. Since the image brightness data Ce, Me, Ye are converted with respect to the respective colors, the gray balance of the image brightness data is optimized.

Furthermore, in order to correct the output characteristics of the image output system 10, e.g., the output characteristics of the LEDs 24, and also the spectral characteristics present between the LEDs 24 and the image recording medium F, the CPU 26 reads predetermined test pattern data from the ROM 28, and drives the LEDs 24 to form on the image recording medium F a test pattern having a succession of brightness steps for each of the colors, with brightness step numbers allotted to the respective brightness steps. Then, the operator compares the test pattern with a reference pattern having a reference brightness, and enters the brightness step number of the brightness step which agrees with the reference brightness, as second corrective parameter setting data, through the setting unit 32.

The second corrective parameter setting data are then transferred through the interface 30 to the CPU 26, which calculates contrast parameters $\alpha c$, $\alpha m$, $\alpha y$ and brightness parameters $\beta c$, $\beta m$, $\beta y$, which are second corrective parameters for obtaining desired color qualities or tones, based on the brightness step number of the second corrective parameter setting data. Using these parameters, the CPU 26 calculates exponential image brightness data Cql, Mql, Yql which are given by:

$$Cql = 2^{**}(\alpha c * Ca + \beta c) \quad \ldots (6a)$$

$$Mql = 2^{**}(\alpha m * Ma + \beta m) \quad \ldots (6b)$$

$$Yql = 2^{**}(\alpha y * Ya + \beta y) \quad \ldots (6c)$$

Figure 7:
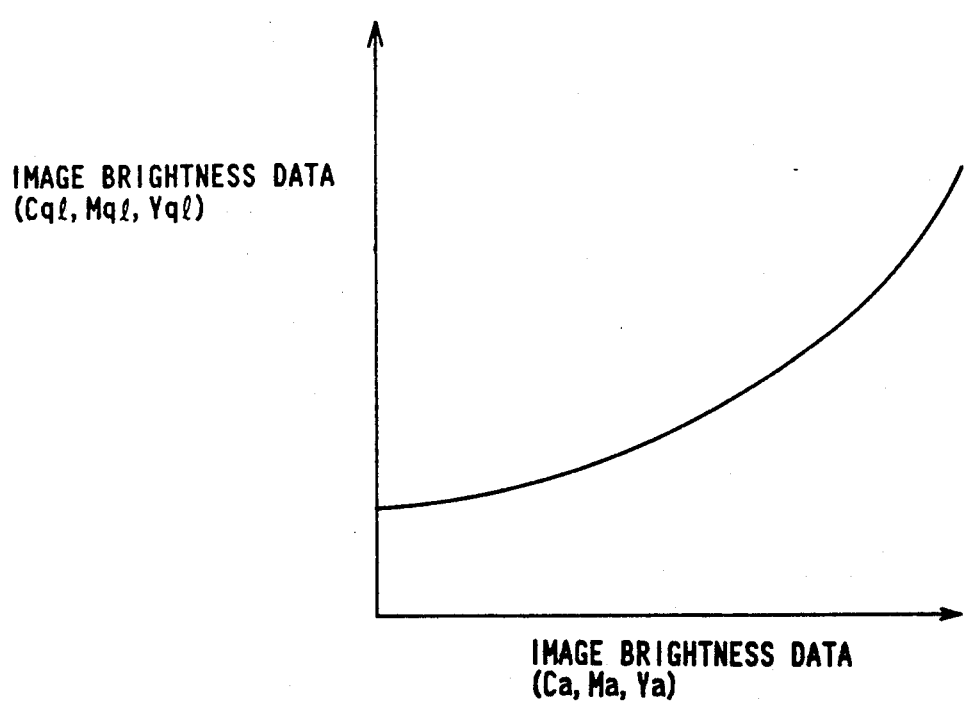
FIG. 7 is a graph illustrative of an exponential conversion process carried out by an exponential converting means.

FIG. 7 shows the relationship between the image brightness data Ca, Ma, Ya and the image brightness data Cql, Mql, Yql. The image brightness data Cql, Mql, Yql are exponential functions of the image brightness data Ca, Ma, Ya. Therefore, the input image data E which have been logarithmically converted by the first look-up table 40 are now exponentially converted into the image brightness data Cql, Mql, Yql.

The first look-up table 40 (FIG. 3), the linear conversion equations (2a) through 2(c) using the first corrective parameters, the second look-up tables 44, 46, 48 (FIG. 6), and the exponential conversion equations (6a) through (6c) using the second corrective parameters, are constructed as internal look-up tables at the time the data shown in FIG. 1 are entered through the setting unit 32, and such internal look-up tables are stored in the RAM 18.

The input image data from the image signal source 12 are transferred through the interface 16 to the RAM 18, and then converted into desired output image data depending on the image signal source 12 and the image recording medium F by the internal look-up tables stored in the RAM 18. Thereafter, the output image data are converted into analog image data by the D/A converter 20, and amplified by the amplifier 22, which supplies the amplified image data to the LEDs 24. Each of the LEDs 24 is energized on the basis of the amplified analog image data supplied thereto, forming cyan, magenta, and yellow images on the image recording medium F which are combined into a desired colored image.

With the present invention, as described above, an input image signal is converted into an image signal in a standardized brightness range using the first look-up table, and the converted image signal is linearly converted into an image signal for desired color qualities or tones based on the first corrective parameters. The linearly converted image signal is then converted into an image signal adapted to the image recording medium using the second look-up tables, and the converted image signal is thereafter converted, on the basis of the second corrective parameters, into an output image signal having exponential function characteristics in order to absorb fluctuations in the image output system and characteristic differences of the image recording medium, which may be caused between different lots of image recording mediums.

The output image signal is now adapted to the image signal source and the image recording medium by the first and second look-up tables. Therefore, an optimum image can be formed on the image recording medium using the output image signal. Because the color qualities or tones of an input image are adjusted in a linear brightness range based on the first corrective parameters, such adjustments can be effected highly easily and accurately to match the human visual characteristics. Fluctuations in the image output system and characteristic differences of the image output system and the image recording medium can accurately and easily be compensated for by the exponential conversion using the second corrective parameters, without reducing the advantages offered by the second look-up tables.

Although a certain preferred embodiment has been shown and described, it should be understood that many changes and modifications may be made therein without departing from the scope of the appended claims.

What is claimed is:

1. An image output system for processing an input image signal from an image signal source to produce an output image signal to record an image on an image recording medium, comprising:
   a first look-up table for converting an input image signal into an image signal which matches the image output system, said first look-up table being selected to match the image signal source;
   linear converting means for linearly converting said image signal, which has been converted by said first look-up table, into an image signal based on first corrective parameters set to achieve given color tone;
   a second look-up table for converting said image signal, which has been converted by said linear converting means, into an image signal which matches the image recording medium, said second look-up table being selected to match the image recording medium; and
   exponential converting means for converting said image signal, which has been converted by said second look-up table, into an exponential output image signal based on second corrective parameters set to achieve given color tone.

2. An image output system according to claim 1, wherein said first look-up table comprises means for logarithmically converting the input image signal into the image signal.

3. An image output signal according to claim 1, wherein said linear converting means comprises means for linearly converting image data LUT_S(Ri), LUT_S(Gi), LUT_S(Bi), corresponding to red-color, green-color, and blue-color input image data Ri, Gi, Bi, which image data have been converted by said first look-up table, into image data Ce, Me, Ye which are expressed by:

$$Ce = \alpha c * LUT\_S(Ri) + bc$$

$$Me = \alpha m * LUT\_S(Gi) + bm$$

$$Ye = ay \cdot LUT\_S(Bi) + by$$

where ac, am, and ay are contrast parameters and bc, bm, an are brightness parameters, said contrast and brightness parameters being set according to said first corrective parameters and corresponding to the colors of cyan, magenta, and yellow.

4. An image output system according to claim 3, wherein said contrast parameters ac, am, ay and said brightness parameters bc, bm, by are defined by:

$$ac = ac_0 \cdot \delta ac_1 \cdot \delta ac_2 \cdot \delta ac_3 \cdot \delta ac_4 \cdot \delta ac_5 \cdot \delta ac_6$$

$$am = am_0 \cdot \delta am_1 \cdot \delta am_2 \cdot \delta am_3 \cdot \delta am_4 \cdot \delta am_5 \cdot \delta am_6$$

$$ay = ay_0 \cdot \delta ay_1 \cdot \delta ay_2 \cdot \delta ay_3 \cdot \delta ay_4 \cdot \delta ay_5 \cdot \delta ay_6$$

$$bc = bc_0 + \delta bc_1 + \delta bc_2 + \delta bc_3 + \delta bc_4 + \delta bc_5 + \delta bc_6$$

$$bm = bm_0 + \delta bm_1 + \delta bm_2 + \delta bm_3 + \delta bm_4 + \delta bm_5 + \delta bm_6$$

$$by = by_0 + \delta by_1 + \delta by_2 + \delta by_3 + \delta by_4 + \delta by_5 + \delta by_6$$

where $\delta ac_1$ through $\delta ac_3$, $\delta am_1$ through $\delta am_3$, $\delta ay_1$ through $ay_3$, $\delta bc_1$ through $\delta bc_3$, $\delta bm_1$ through $\delta bm_3$, and $\delta by_1$ through $\delta by_3$ are first corrective parameters set for the colors of cyan, magenta, and yellow so as to correspond to brightness steps thereof, $\delta ac_4$, $\delta am_4$, $\delta ay_4$, $\delta bc_4$, $\delta bm_4$, $\delta by_4$ are first corrective parameters set for the colors of cyan, magenta, and yellow so as to correspond to general brightness steps thereof, $\delta ac_5$, $\delta am_5$, $\delta ay_5$, $\delta bc_5$, $\delta bm_5$, $\delta by_5$ are first corrective parameters set for the colors of cyan, magenta, and yellow so as to correspond to general brightness steps thereof, $\delta ac_6$, $\delta am_6$, $\delta ay_6$, $\delta bc_6$, $\delta bm_6$, $\delta by_6$ are first corrective parameters set so as to match the image recording medium, and $ac_0$, $am_0$, $ay_0$, $bc_0$, $bm_0$, $by_0$ are first corrective parameters as initial parameters.

5. An image output system according to claim 1, wherein said exponential converting means comprises means for exponentially converting cyan, magenta, yellow image data Ca, Ma, Ya, which have been converted by said second look-up table, into exponential image data Cql, Mql, Yql which are expressed by:

$$Cql = 2^{**}(ac \cdot Ca + \beta c)$$

$$Mql = 2^{**}(am \cdot Ma + \beta m)$$

$$Yql = 2^{**}(ay \cdot Ya + \beta y)$$

where αc, αm, αy are contrast parameters serving as second corrective parameters for the respective colors of cyan, magenta, yellow, and βc, βm, βy are brightness parameters serving as second corrective parameters for the respective colors of cyan, magenta, and yellow.

* * * * *